United States Patent [19]
Eastham et al.

[11] 3,836,799
[45] Sept. 17, 1974

[54] LINEAR INDUCTION MOTOR WITH ELECTROMAGNETIC LEVITATION

[76] Inventors: John Frederick Eastham, 6 Cumbrae Gardens; Eric Roberts Laithwaite, 'The Circles', Wentworth Close, both of Ditton Hill, Long Ditton, Surrey, England

[22] Filed: May 14, 1973

[21] Appl. No.: 359,874

[30] Foreign Application Priority Data
  May 25, 1972  Great Britain................. 24746/72

[52] U.S. Cl. ........................... 310/13, 104/148 LM
[51] Int. Cl. ........................................ H02k 41/04
[58] Field of Search ............... 310/12, 13, 166, 216; 104/148 LM; 318/135

[56] References Cited
UNITED STATES PATENTS
| | | | |
|---|---|---|---|
| 782,312 | 2/1905 | Zehden | 310/13 |
| 3,585,423 | 6/1971 | Bolton et al. | 310/13 |
| 3,644,762 | 2/1972 | Eastham | 310/13 |

*Primary Examiner*—Gerald Goldberg
*Attorney, Agent, or Firm*—Cameron, Kerkam, Sutton, Stowell & Stowell

[57] ABSTRACT

In a combined electromagnetic levitation arrangement and linear induction motor, the secondary consists of a sheet of electrically conductive non-magnetic material. The primary consists of a core of magnetic material providing paths for working flux in planes perpendicular to the desired direction of relative movement between the primary and the secondary, and polyphase windings on the core.

9 Claims, 10 Drawing Figures

LINEAR INDUCTION MOTOR WITH ELECTROMAGNETIC LEVITATION

This invention relates to electrical machines of the kind which employ electromagnetic levitation.

It is already known that if a sheet of non-magnetic electrically conductive material is disposed with one of its faces confronting an electromagnet energised with alternating current, the electromagnet and the sheet repel one another. It is also known that, with certain configurations for the electromagnets, the electrically conductive sheet can be stably supported above such an electromagnet by this force of repulsion. One configuration for the electromagnets or primary which has been used for this purpose is disclosed in E. R. Laithwaite, "Propulsion Without Wheels," English Universities Press, 1966, pages 190 to 196 and consists of a pair of elongate cores of magnetic material and of E-shaped cross-section each having windings disposed around the centre tooth of the E-shape and spaced apart by a distance such that the spacing between the centre teeth of the two cores is approximately equal to the width of the electrically conductive sheet.

P. Hochhausler "Die Magnetische Schwebdbahn," Elektrotechnische Zeitschrift, Part B, Volume 23 (1971), pages 311 to 313 discloses an electromagnetic levitation arrangement in which the primary consists of a row of pairs of electromagnets having E-shaped cores oriented and laminated longitudinally and having windings on all three limbs. The secondary is in the form of an aluminium sheet and, when the windings are energised with single phase alternating current, the aluminium sheet is supported stably above the primary. When each of the three windings of each core is energised with a respective phase of a three-phase alternating current supply, the secondary is both supported above the primary and propelled longitudinally. In both cases, substantially all the working flux passes longitudinally.

According to the invention, there is provided an electrical machine having a secondary comprising electrically conductive material and a primary comprising a core of magnetic material having at least two rows of pole faces confronting said secondary and being arranged to provide paths for working flux between said rows of pole faces in planes substantially perpendicular to said rows, the secondary being arranged to provide longitudinal paths for each current on each side of each row of pole faces and transverse paths interconnecting said longitudinal paths, the primary being arranged when energised from a polyphase alternating current supply, to create a magnetic field operative to produce a force between said primary and said secondary having first components tending to maintain said primary and said secondary spaced apart from one another, second components tending to maintain said primary and said secondary in alignment with one another in a direction perpendicular to said rows of pole faces and third components tending to cause relative displacement between said primary and said secondary in a direction parallel to said rows of pole faces.

Thus a machine in accordance with the invention consists of both a linear motor and a levitation arrangement.

Preferably the secondary comprises a sheet of electrically conductive material.

To ensure stable levitation, the width of the secondary for any particular operating separation from the primary must be such that if the secondary tilts relative to the primary or if the primary and secondary move towards one another, there is a substantial change in the magnetic flux traversing the secondary. If the secondary is too narrow, it will pass between the secondary and the primary without intersecting the secondary. On the other hand, if the plate is too wide, substantially all the flux will traverse the plate under all conditions of tilt and separation between the primary and secondary. If the secondary is marginally wider than the ideal of width, it will be found that it will be most stable at a separation of somewhat greater than that at which a somewhat narrower secondary would be most stable. It should, of course, be realised that the foregoing remarks are equally applicable to the situation when the primary is movable and the secondary is fixed.

In order that the invention may be more readily understood, embodiments thereof will now be described with reference to the accompanying drawings, in which.

Figure 1:
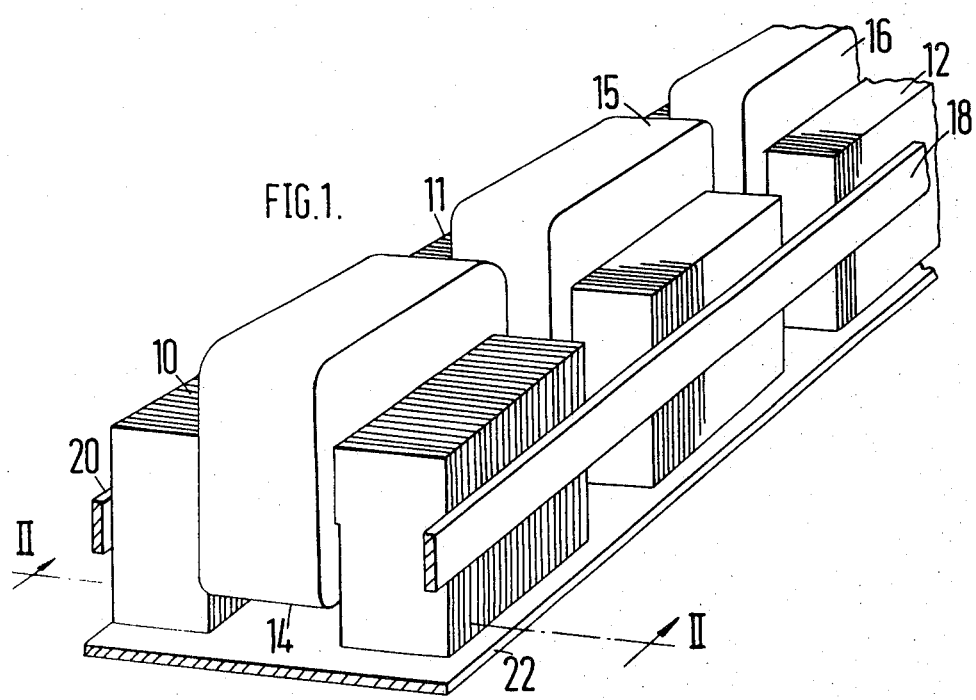
FIG. 1 is a perspective view of an electrical machine in accordance with the invention.
Figures 2, 3:
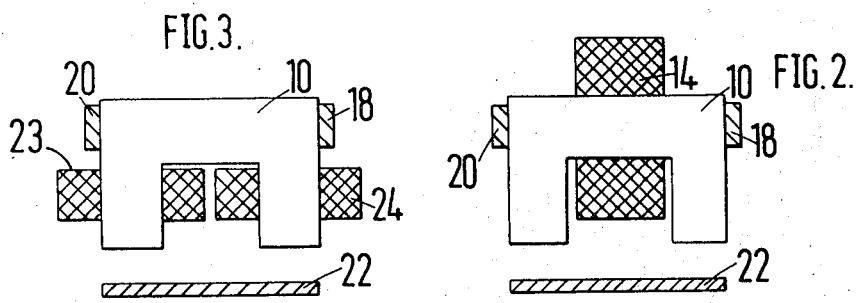
FIG. 2 is a cross-sectional view taken on the line II—II in FIG. 1.
FIG. 3 is a cross-sectional view, similar to FIG. 2, of a second embodiment of the invention.

Referring to FIGS. 1 and 2, the primary of the levitation device comprises a series of U-shaped cores such as the cores 10, 11 and 12, formed from laminations of magnetic material and having respective windings 14, 15 and 16. The cores 10, 11 and 12 are secured together by side members 18 and 20.

The secondary consists of a sheet 22 of non-magnetic electrically conductive material such as aluminium. The overall length of the sheet 22 (in the direction parallel to the side members 18 and 20) is very much greater than the length of the primary.

If the windings 14, 15 and 16 of the primary are energised with single phase alternating current, a pure levitation effect is produced, the primary being supported above the secondary 22 and stabilised laterally in alignment therewith. No force between the primary and secondary exists in the longitudinal direction, the primary being free to move longitudinally.

On the other hand, if successive coils 14, 15 and 16 of the primary are energised with successive phases of a polyphase alternating current supply, in addition to the levitation effects produced by the single phase energisation, a travelling magnetic field is produced in the longitudinal direction so that the primary now tends to move longitudinally with respect to the secondary.

As before, it is supported above the secondary and stabilised laterally.

As shown in FIG. 3, which is a sectional view similar to FIG. 2, the windings 14, 15 and 16 may each be split into two sections such as the sections 23 and 24 with one section disposed on each side limb of their respective cores 10, 11 and 12.

It has been found by measurement that, when the arrangement shown in FIG. 3 is energised from a single phase alternating current supply with the currents in all the windings in the same direction, the induced currents in the sheet 22 are, in effect, an image of the currents in the primary windings 23 and 24. In other words, there is a longitudinal current flow along the centre of the sheet 22 below the core slot and return current paths along the edges of the sheet.

Figure 4:
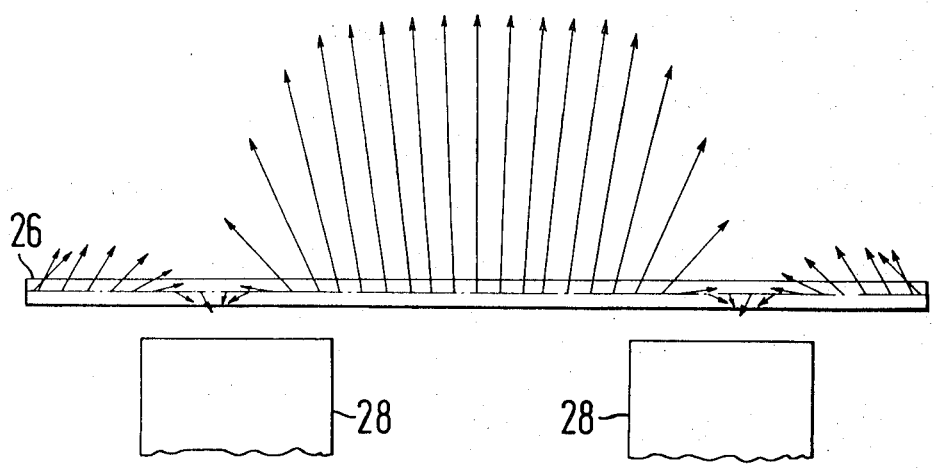
FIGS. 4 and 5 are stress diagrams illustrating the forces on the secondary due to a primary of the type shown in FIG. 3.
Figure 5:
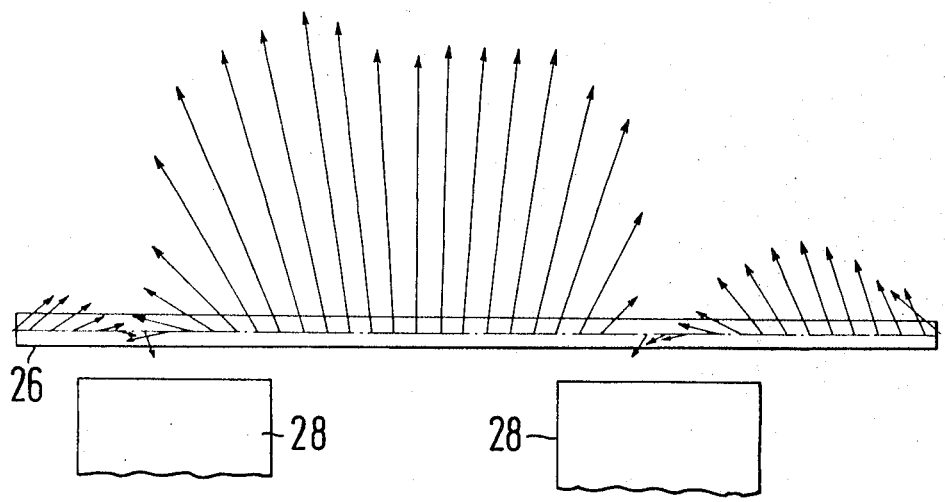

FIGS. 4 and 5 illustrate the forces produced on the secondary by an arrangement similar to that illustrated in FIG. 3 but with the secondary consisting of a sheet 26 of a material such as aluminium which is somewhat wider than the primary core 28 which is disposed below the sheet 26 so as to support it. The stress values were calculated using the Maxwell stress method from measurements of the flux distribution close to the plate. The stress values at various points on the centre line of the plate are shown in vector form by the arrows. From FIG. 4 it can be seen that, when the sheet 26 is symmetrically disposed relative to the core 28, upward forces are produced on the central region of the sheet 26 inwardly directed forces are produced near the edges and outwardly directed forces are produced between the centre and each edge. On the other hand, as shown in FIG. 5, if the sheet 26 is displaced horizontally and transversely relative to the core 28, the inwardly directed stabilising forces on the side to which the plate is displaced are increased while the outwardly directed forces nearer to the centre of the plate are not greatly changed.

With the arrangements shown in FIGS. 1 and 2 and in FIG. 3 where the primary is supported above the secondary, it will be usual for the secondary to be substantially longer than the primary. For example, in the case of a high speed transport system, the primary would form part of the vehicle and secondary would be the track. The invention equally provides for the reverse situation where the primary is located below and supports the secondary. In this case, it would be more usual for the primary to be substantially longer than the secondary. In either case, either the primary or the secondary may be the longer element but the shorter element must, at all times remain within the bounds of the longer element if stable levitation is to be maintained.

Figure 6:
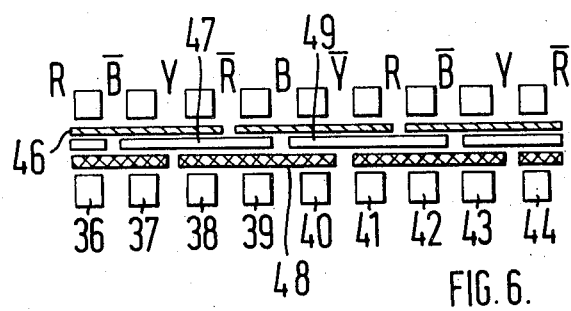
FIG. 6 is a schematic plan view of an alternative winding arrangement for the embodiment shown in FIGS. 1 and 2.
Figure 7:
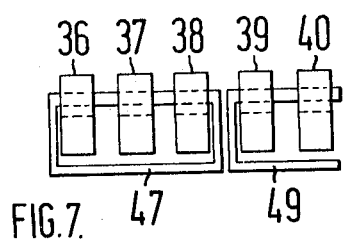
FIG. 7 is an elevational view illustrating the winding arrangement shown in FIG. 6.

FIGS. 6 and 7 illustrate an alternative winding configuration for the primary of the embodiment shown in FIGS. 1 and 2 for use with a three-phase supply. A similar configuration may be used with the embodiment shown in FIG. 3. As before, the core structure consists of a set of identical U-shaped core sections, of which nine, 36 to 44 are shown. Each winding encircles three core sections and each core section is encircled by three windings, one for each phase, the windings for adjacent phases being displaced by one core section. For example, the red phase winding 46 encircles core sections 36, 37 and 38, the blue phase winding 47 encircles core sections 37, 38 and 39, the yellow phase winding 48 encircles core sections 38, 39 and 40, the next red phase winding 49 encircles core sections 39, 40 and 41 and so on. As can be seen from FIG. 6, where the letters R, Y and B denote the phases of the currents in the vertical parts of the windings passing through the gaps so denoted between adjacent core section, the direction of currents in adjacent windings of the same phase such as the windings 36 and 39 in opposite. As can best be seen in FIG. 7 where only the red phase windings 46 and 49 are shown, the return path of the windings is across the back of the core sections.

Figure 8:
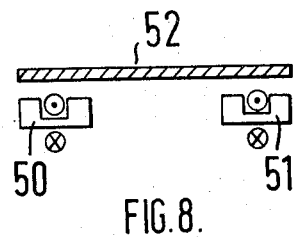
FIG. 8 is a lateral cross-sectional view of a third embodiment of the invention.

FIG. 8 illustrates an alternative embodiment of the invention in which the primary consists of two units 50 and 51 each of which is substantially the same as either the primary of the embodiment shown in FIGS. 1 and 2 or the primary shown in FIGS. 4 and 5. The two sections 50 and 51 of the primary are disposed side by side and the windings are so connected to the A.C. supply that the currents in adjacent windings are in the same direction and, in the case of a polyphase supply, of the same phase. The secondary 52 consists of an aluminium plate of width approximately equal to the overall width of the primary.

Figure 9:
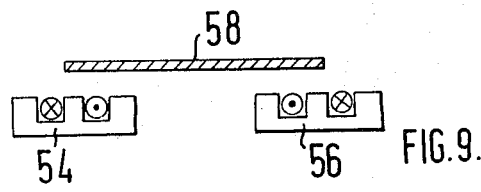
FIG. 9 is a lateral cross-sectional view of a fourth embodiment of the invention.

FIG. 9 shows an alternative arrangement in which the primary consists of two parallel rows 54 and 56 of core sections of generally E-shape cross-section. The secondary consists of a plate 58 of an electrically conductive non-magnetic material such as aluminium. The width of the plate 58 is approximately equal to the distance between the centre teeth of the two rows of primary core sections. The windings are surface windings encircling the centre tooth of each E-shape and may be in the form of individual windings for each core section as was the case for the embodiment illustrated in FIGS. 1 and 2. Alternatively, the windings may encircle more than one core, for example in a manner equivalent to that shown in FIG. 6. The windings are so connected that the direction of the current in the inner slot of each core section is the same as that in the inner slot of adjacent core section of the other row.

Figure 10:
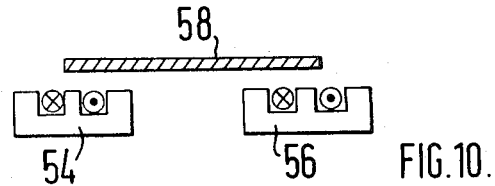
FIG. 10 is a lateral cross-sectional view of a fifth embodiment of the invention.

FIG. 10 illustrates an alternative embodiment which is similar to that shown in FIG. 9 except that the direction of the currents in the windings of the core sections of the row 56 are reversed so that the direction of the current in the inner slot of each core section is in the same direction as that in the outer core slot of the adjacent core section of the other row.

With any of the embodiments illustrated in FIGS. 8 to 10, the primary may be disposed above the secondary so that it is the primary and not the secondary which is supported by electromagnetic levitation.

We claim:

1. An electrical machine having a secondary comprising electrically conductive material and a primary comprising a core of magnetic material having at least two rows of pole faces disposed side by side confronting one side of said secondary with a single horizontal airgap therebetween, said core being arranged to provide paths for working flux between said pole faces in planes substantially perpendicular to said rows of pole faces and having polyphase windings thereon, the secondary being arranged to provide longitudinal paths for electric current on each side of each row of pole faces and transverse paths for electric current interconnecting said longitudinal paths, the primary being arranged, when energized from a polyphase alternating current supply, to create a magnetic field operative to produce a force between said primary and said secondary having first components tending to maintain said primary and secondary spaced apart from one another, second components tending to maintain said primary and said secondary in alignment with one another in a direction perpendicular to said rows of pole faces whereby one of said primary and said secondary is supported in a stable position above the other and third components tending to cause relative displacement between said primary and said secondary in a direction parallel to said rows of pole faces.

2. An electrical machine as claimed in claim 1, in which the secondary comprises a sheet of electrically conductive non-magnetic material.

3. An electrical machine as claimed in claim 2, in which the core of the primary comprises a row of members of U-shaped cross-section.

4. An electrical machine as claimed in claim 3, in which the polyphase windings comprise a set of coils each of which encircles at least two adjacent members of the primary core.

5. An electrical machine as claimed in claim 2, in which the primary is formed in two sections disposed side by side, each section comprising at least two rows of pole faces confronting the secondary and a respective set of polyphase windings.

6. An electrical machine as claimed in claim 5, in which each section of the primary comprises a row of members of U-shaped cross-section.

7. An electrical machine as claimed in claim 6, in which the polyphase windings comprise a set of coils each of which encircles at least two adjacent members of the primary core.

8. An electrical machine as claimed in claim 4, in which each section of the primary comprises a row of members of E-shaped cross-section.

9. An electrical machine as claimed in claim 8, in which the polyphase windings comprise a set of coils each of which encircles at least two adjacent members of the primary core.

* * * * *

PO-1050
(5/69)

UNITED STATES PATENT OFFICE
CERTIFICATE OF CORRECTION

Patent No. 3,836,799  Dated September 17, 1974

Inventor(s) John Frederick Eastham et al.

It is certified that error appears in the above-identified patent and that said Letters Patent are hereby corrected as shown below:

Cover page, after item [76] insert:
--[73] Assignee: Tracked Hovercraft Limited,
          London, England--.

Signed and sealed this 4th day of March 1975.

(SEAL)
Attest:

RUTH C. MASON
Attesting Officer

C. MARSHALL DANN
Commissioner of Patents
and Trademarks